Jan. 3, 1956
B. M. HADFIELD
2,729,771
ELECTRIC RELAY SYSTEMS
Filed Jan. 28, 1949
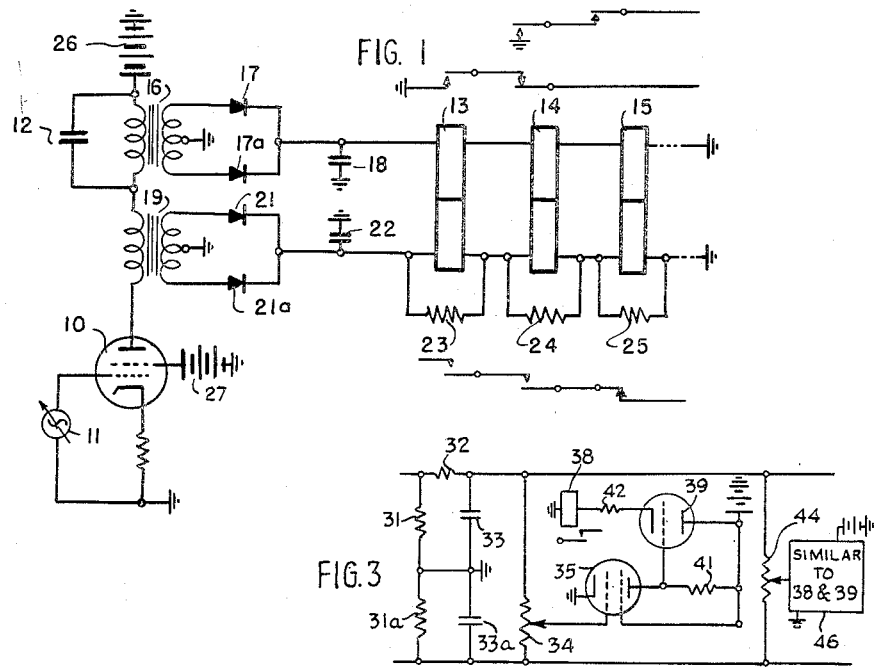
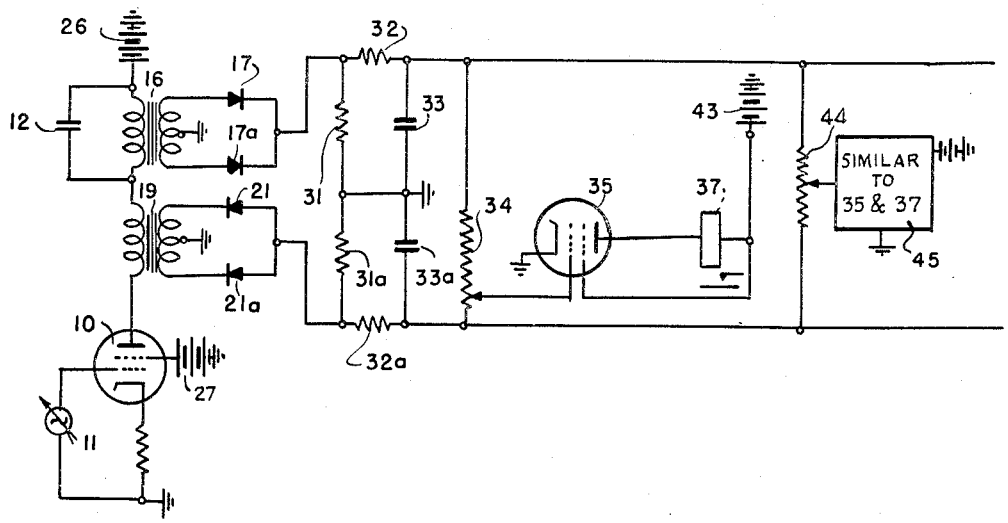
*INVENTOR.*
BERTRAM M. HADFIELD
BY
*ATTORNEY*

United States Patent Office 2,729,771
Patented Jan. 3, 1956

2,729,771

ELECTRIC RELAY SYSTEMS

Bertram M. Hadfield, Manchester, Mass., assignor to Automatic Electric Laboratories, Inc., Chicago, Ill., a corporation of Delaware Application January 28, 1949, Serial No. 73,365

14 Claims. (Cl. 317—138)

This invention relates to a system for the remote control of relays and, more particularly, to a system whereby one particular or several particular relays of a plurality of relays in the same circuit may be operated by setting the frequency of the current to a particular value.

It is an object of the invention to provide a system for the remote control of a series of relays connected to a single circuit.

It is another object of this invention to provide a system whereby frequency control of one of two voltages impressed upon a circuit containing a plurality of relays enables a series of relays to be operated in succession.

This invention envisions the use of a variable audio frequency generator to be used for inducing current changes in the plate circuit of a tube in accordance with the changes in frequency. These changing currents in the tube plate circuit will then be applied to a transformer primary winding which will produce a voltage drop across its primary of constant value regardless of the frequency of the changing currents. These rapidly changing currents will also be applied to a circuit resonant at the higher range of audio frequency; this circuit consisting of a transformer primary and a capacitor which transformer primary will induce higher voltages in its secondary as the frequency of change in the plate current increases. The current induced in the secondary windings in the two transformers will be rectified and each will be applied to a separate winding of a series of double wound relays.

There will be more than one of these double wound relays. Each of the relays will have the windings to which the constant voltage is applied in series and the windings to which the variable voltage is applied also in series. The windings of the relays will be adjusted so that certain relays will operate when the voltage is varied on the upper winding in accordance with the frequency being emitted from the frequency generator. The relays operated by the particular induced voltage will then complete circuits corresponding to the applied frequency which circuits may be used for operating certain corresponding equipment in any well known manner.

The invention both as to its organization and method of operation, together with further objects and features thereof, will best be understood by reference to the specification and the accompanying drawing.

Referring to the drawing,

Figure 1 illustrates an embodiment of this invention in which polarized relays effect control of operations; and Figures 2 and 3 illustrate embodiments of the invention in which spring-biased relays are operated by electron tubes.

Briefly described, the invention is designed to provide operation of different relays when different frequencies are applied to the overall circuit, each relay operable responsive to application of a predetermined frequency. Operation is controlled by the resultant of two voltages impressed on two circuit elements; a first element providing a voltage substantially independent of input frequency variations and a second element providing a voltage directly dependent upon input frequency. In one embodiment of the invention these two voltages (at the same polarity) are directly impressed across a series of two-winding relays and the individual relay circuits are so adjusted that each relay operates only when the voltage (corresponding to a certain frequency) impressed across one winding, over the second circuit element, equals the voltage impressed on the other winding, over the first circuit element. In another embodiment of the invention the two voltages (at opposite polarity) are impressed on a series of parallel connected potentiometers—one voltage at each end. A combination relay-tube circuit is associated with each potentiometer and is connected thereto by means of a variable tap. The variable tap for any particular relay-tube combination is so adjusted that when a predetermined frequency is applied to the overall circuit the frequency dependent voltage, over the second circuit element, taken in conjunction with the frequency independent voltage, over the first circuit element, causes zero or ground potential to be placed thereon. The relay associated therewith will thus operate. Each variable tap associated with the other relay-tube combinations is placed so that each relay operates at a different frequency input.

Referring to Figure 1, a high impedance source 10 consists of an electron tube such as a tetrode or pentode, the grid circuit of which is driven by an alternating current 11 to supply the power to operate the several relays according to the invention.

The frequency of generator 11 may be varied so that the alternating component of the plate current of tube 10 (i. e., the current flowing through the two left-hand windings of transformers 16 and 19) will be at different frequencies, depending on generator 11. The parallel combination of condenser 12 and the left hand winding of transformer 16 has the well-known characteristic of swinging with frequency, namely, the output voltage across the transformer winding varies considerably at different frequencies. The primary of transformer 19, of course, renders a substantially constant voltage with changing frequency. Thus, if the frequency of generator 11 is changed the voltage output on the secondary of transformer 16 changes also; whereas the voltage output on the secondary of transformer 19 remains relatively the same.

As stated the variations in frequency of the frequency generator at 11 will be reproduced in the plate circuit of the tube to in turn produce a variable potential in the secondary of transformer 16. This potential increasing in value as the frequency increases. The voltage in the secondary transformer 19 being very constant it will be only necessary to vary the resistance of the winding of relays 13, 14 and 15 to secure their operation in succession as the potential increases in the secondary of transformer 16 with rising frequency. Operation of relay 13 will cause its contacts to close a circuit corresponding to its operative frequency. It will also operate other contacts to prepare a circuit which will be complete when relay 14 operates to close its contacts while relay 13 remains operated. Relay 14 will also open the original circuit closed by relay 13 and prepare a circuit which will be complete when relay 15 operates. On application of the proper frequency to transformer 16 relay 15 will operate to open the circuit closed by relay 14 and close the circuit corresponding to its operative frequency. Thus the relays 13, 14 and 15 operate additively to close circuits corresponding to particular frequencies. These circuits operating in any well known manner will be prepared in accordance with the operation of relays 13, 14 and 15 etc. to operate a designated piece of equipment in accordance with the related frequency.

It will be noted that although the preferred illustration shows transformers 16 and 19 in series it is not necessary for them to be so arranged.

As regards the production of a voltage or current rising or falling with frequency, it is obviously desirable that the characteristic shall be linear with frequency, since this gives equal rates of change at any frequency and hence equal operating conditions for all relays. Also the adjustments and alteration of operating frequency is a simple matter. While such characteristics can be obtained from a substantially pure inductance or capacitance fed with an invariant current magnitude, in practice the necessary loading reduces the frequency range over which the output may be considered linear. Taking the capacitance case as illustrative, if a condenser be fed via a resistance from a zero-impedance source, then the output is substantially linear over a range of .3 to 1.3 times the frequency given by the reciprocal of the time constant (in radians per second). The voltage on the resistance, however, is not so linear for the same change in output (about 0.4 times the input). Furthermore the initial magnitude of the exponential transient, when excited by a pulse of frequency, can never exceed that of steady state alternations in the case of condenser output, whereas it can be many times the steady state for resistance. Hence use of a resistance-fed condenser is preferred for the invention (or the corresponding inductive analog), and the production of a falling characteristic is of no consequence, since the effect on the relay may be reversed by reversing the connections thereto. In addition, this form of circuit is readily translated into the form where the condenser and resistance are in parallel and the whole is fed by a high impedance source, and thus can be driven by a pentode or tetrode tube with a large gain effect.

Having obtained a voltage varying linearly with frequency, it is necessary to apply it to the relay or other device together with a counter-voltage not varying with frequency whose magnitude determines the frequency at which the relay will operate. The determining factor is the ratio between these two voltages and in order to keep a given ratio with input level variations, the counter-voltage is preferably derived from the input to the frequency dependent circuit. Both voltages are, of course rectified before subtraction and application to the relay, and there are many ways in which this may be done.

As this frequency generator is designed to work primarily in the audio frequency range it should be noted that the resonant circuit provided by 12 and the primary of transformer 16 will not necessarily be critical but will be more resonant for the higher frequency then the lower to thus enable the induction of higher potentials in the secondary of transformer 16 as the frequency emitted by frequency generator 11 increases.

A transformer 16 acts as a coupling device and means whereby the current through the relays is rectified by rectifiers 17 and 17a. A condenser 18 reduces the ripple in the relay current and such a load circuit presents the appearance of a resistance. A bias circuit consists of a transformer 19, rectifiers 21 and 21a, and a condenser 22. This bias circuit is similar to the circuit of the transformer 16 except for the absence of a shunting capacitance corresponding to the condenser 12. The lower windings of the relays 13, 14, and 15 are either of a successively greater number of turns or are shunted by a series of resistances 23, 24, and 25 so that successive relays operate at higher currents thus producing a series of operations with increasing frequency.

Plate current is supplied to the circuit from a source such as a battery 26. A small biasing current is provided by operating the frequency generator 11 at low frequencies to thereby minimize current usage and eliminate the need for another source of biasing current. This biasing current is induced in the secondary of transformer 19 but will not be appreciably induced in the secondary of transformer 16 as it is of low frequency. From the secondary of transformer 19 the current passed through the relays to retain the armatures on the break side in the absence of a signal.

As shown in Figure 2, spring-biased relays may be substituted for polarized relays but in this event an electron tube and a high-impedance ratio-measuring circuit must be employed with each relay. In Figure 2 the subtracting circuit demands that the polarity of one of the terminals emerging from the rectifiers be reversed as indicated by the reversed position of rectifiers 21 and 21a in Figure 2. The voltages are developed across load resistances 31 and 31a, and smoothed by a pair of condenser-resistance circuits 32—32a and 33—33a. This method permits the load thrown back on the generators to be the resistances 31 and 31a while giving the smallest build-up time consistent with linearity.

The series-aiding voltages on the condensers 33 and 33a are bridged by a potentiometer 34 so that the voltage between the arm of the potentiometer and the ground is zero for ratios between the inputs determined by the position of the arm. As the applied frequency is altered the arm to ground voltage reduces to zero at a given ratio and thereafter increases with the opposite polarity. Applying it to the grid-cathode circuit of an electron tube permits the change at around zero to effect operation of a relay such as 37. For this purpose the tube 35 has a high amplification factor so that the smallest change in input voltage is needed to effect the full anode current change.

In order to reduce still further this input change, and so reduce the overlap between pass bands, a relay 38 may be operated from a cathode follower 39 (as shown in Fig. 3), the grid potential of which is derived from an anode resistance 41 of the tube 35. By making the resistance 41 very large so that its load line intercepts the anode characteristics below the "knee" value the effective operating grid base voltage of the tube 35 may be reduced at will. A resistance 42 serves to boost the resistance of the relay 38 to a value consistent with the proper operation of the cathode follower 39. A battery 43 provides a direct current.

A potentiometer 44 is connected in parallel with the potentiometer 34 and this second potentiometer is part of a circuit 45 similar to the circuit of tubes 35 and 39.

Additional potentiometer circuits may be included as operating conditions may require additional relay controls. The only difference lies in the setting of the potentiometer arms, which are arranged to give zero output to the relay circuits at various desired ratios of the frequency-dependent and non-dependent voltages, so that the relays operate at different frequencies of input.

By adjustment of the resistances 23, 24 and 25 in Figure 1, or the potentiometer arms in Figure 2 or 3, any series of band-pass or band-stop frequency operations can be obtained merely by appropriately combining the individual operations of relays or the like, together with use of make or break contacts thereon.

Assuming that the relays are operated from a voltage having a rising characteristic with frequency, then in any given pass-band it is the lower-frequency relay contact which is effective, and vice versa for a falling frequency characteristic. Thus, impulse distortion is due only to this relay, and is small owing to the excellent wavefront obtainable from a circuit which has only a gradual rising or falling frequency characteristic.

On pulse operation the distortion of the wavefront cannot exceed the steady state magnitude where the condenser voltage is used for the frequency-dependent output. The possibility of this surge operating the higher ratio relays is negligible in practice since its time constant is generally very much smaller than the operate lag of the relays.

For normal relay operation over the normal speech frequency band a very large number of signal band widths without mutual interference are possible. The individual pulse operation is excellent and only limited by the smoothing circuit wave-front build-up and decay.

While particular embodiments of the invention have been illustrated, it is to be understood that numerous modifications in the details of arrangement may be resorted to without departing from the true spirit and scope of the invention as defined in the appended claims.

I claim as my invention:

1. A signalling system having means for generating a number of currents of different frequencies, another means arranged to be controlled by each current generated by the first means and applied thereto for simultaneously providing a constant voltage regardless of the frequency of each applied current and a voltage proportional to the frequency of each applied current, means for applying the currents generated by the first means to said other means to control said other means to provide a constant voltage and a voltage proportional to the frequency of each generated current, a plurality of switch control elements of which a different number are arranged to be controlled by said constant voltage and each different proportional voltage when applied simultaneously to all of said switch control elements, and means for simultaneously applying to all of said switch control elements said constant voltage and the proportional voltage provided by said other means when controlled by a certain frequency of current to control only the number of said switch elements arranged to be controlled by said constant voltage and said proportional voltage.

2. An arrangement such as described in claim 1, in which said other means includes a first and second transformer, each having a primary connected in series with said generating means and in which each generated current is applied to the transformer primaries over said connection and a capacitor is connected in shunt with said second transformer primary, whereby said first transformer primary induces a constant voltage in its secondary regardless of the frequency of the current applied thereto over said connection, and said second transformer primary induces a voltage proportional to the frequency of the current applied thereto over said connection, and said means for applying a constant voltage and a proportional voltage to said switch control elements includes unidirectional circuits individually interconnecting each transformer secondary with said switch control elements for simultaneously applying a constant voltage and a proportional voltage respectively to all of said switch control elements for each frequency of current generated.

3. An arrangement such as described in claim 1, in which said switch control elements each comprises a double wound relay of which one winding on each relay is connected in series with a corresponding winding on each other relay and the other winding on each relay is connected in series with another corresponding winding on each other relay, and in which said means for applying a constant voltage and a proportional voltage is arranged to apply said constant voltage to each one winding of each relay over the series connection therebetween and said proportional voltage to each other winding of each relay over the series connection therebetween for controlling the number of relays arranged to be controlled by said constant and the provided proportional voltage.

4. An arrangement such as disclosed in claim 1, in which said switch control elements each comprises a potentiometer and a valve arrangement, each potentiometer having a different individual point thereon connected to its associated valve arrangement where a conditioning voltage is produced when a constant voltage and a certain one or ones of said proportional voltages are applied to said potentiometer, and means for conditioning each valve arrangement when said conditioning voltage is produced at the individual point on its associated potentiometer.

5. In a signalling system, means for generating currents of different frequencies, a circuit element arranged to be controlled by all of said generated currents when applied thereto for providing a constant voltage regardless of the frequency of the controlling current, another circuit element arranged to be controlled by all of said generated currents when applied thereto for providing a voltage individually corresponding to the frequency of the generated current controlling it, means for applying each generated current to the first and other circuit elements for controlling them to respectively provide a constant voltage and a voltage individually corresponding to each frequency of current applied thereto, a plurality of relays individually adjusted to operate on the application thereto of an individually different number of said corresponding voltages and said constant voltage, and means for applying said provided constant voltage and one of said corresponding voltages simultaneously to all of said relays for operating only such relays as are adjusted to operate on the application thereto of said one corresponding voltage and said constant voltage.

6. In a signalling system having a circuit element controlled by a fluctuating current applied thereto for providing a constant voltage regardless of the frequency of the controlling fluctuating current, another circuit element controlled by a fluctuating current applied thereto for providing a voltage individually corresponding to the frequency of the controlling fluctuating current, means for generating and applying fluctuating currents of different frequencies to said circuit elements for controlling them to provide a constant voltage and a number of voltages individually corresponding to each different frequency of the fluctuating current applied thereto respectively, a plurality of switch control elements arranged so that a different individual number are controlled on the simultaneous application to all of said control elements of said constant voltage and each different corresponding voltage, and means connecting each of said circuit elements to said switch control elements for applying each corresponding voltage provided by said other circuit element and said constant voltage provided by said first circuit element simultaneously to all of said control elements for controlling the individual number thereof corresponding to each provided corresponding voltage.

7. An arrangement such as described in claim 6, in which said switch control elements each comprises a potentiometer having a point thereon where a minimum voltage is produced when said constant voltage and one of said corresponding voltages controlling the switch control element is applied thereacross, said means connecting each circuit element to said switch control elements for applying the provided constant and individually corresponding voltages to said control elements arranged to apply said provided voltages across each potentiometer simultaneously to thereby produce said minimum voltage at the point on each potentiometer representing a switch control element arranged to be controlled by the provided corresponding voltage, and an electronic valve arrangement connected to said point in each potentiometer and conditioned whenever said minimum voltage is produced at said point on its associated potentiometer.

8. In a signalling system having a source of variable frequency current comprising an electronic tube having plate, grid and cathode circuits, means for rendering said tube conductive so that current flows in said plate circuit, and a variable frequency generator connected between said grid and cathode circuits for varying the frequency of the current in said plate circuit, a plurality of elements in said plate circuit of which one is arranged to be controlled by the plate current in said plate circuit for providing a constant potential regardless of the frequency of the controlling current, another of said elements arranged to be controlled by the current in said plate circuit for providing a potential whose magnitude is dependent on the frequency of the controlling current, a plurality of switch control elements of which a different number are arranged to be controlled by said constant potential and each dependent potential of different magnitude applied to said switch control elements, and means for applying said constant potential and a dependent potential of a certain magnitude to said switch control elements for controlling a number of switch control elements corresponding to the magnitude of said dependent potential.

9. An arrangement such as described in claim 8, in which said switch control elements each comprises a double wound relay, one winding on each relay connected in series with one winding on each other relay, the other winding on each relay connected in series with each other winding on each other relay, and in which said applying means is arranged to apply said constant potential to one of said series of windings and said dependent potential to the other series of windings, said windings arranged to enable the control of the number of relays corresponding to the magnitude of the dependent potential applied thereto only on the application thereto of said constant potential and a dependent potential of corresponding magnitude.

10. An arrangement such as described in claim 8, in which said circuit element providing said constant potential includes a transformer having a primary connected in series with said plate circuit whereby a constant potential is induced in the secondary of the transformer regardless of the frequency of the plate current, said circuit element providing the dependent potentials including a second transformer having a primary with a shunt capacitor and connected in series with said plate circuit, whereby a potential whose magnitude is dependent on the plate current frequency is induced in the secondary of said second transformer, and said means for applying said potentials to said switch control elements comprises a unidirectional circuit interconnecting each transformer secondary with each switch control element whereby a direct current potential is applied over each unidirectional circuit to said control elements.

11. A system such as claimed in claim 10, in which each of said control elements comprises an electronic valve arrangement, a potentiometer for each valve arrangement connected between each unidirectional circuit, each valve arrangement connected at a point thereon where a particular potential effect is established whenever a dependent potential of a magnitude corresponding to the switch control element and said constant current are applied over the respective unidirectional circuits, and means for conditioning each valve arrangement when said potential effect is established at the point where it is connected to the associated potentiometer.

12. A system such as claimed in claim 11, in which each valve arrangement comprises a first electronic valve conditioned when said voltage effect is established at the point on its associated potentiometer to which it is connected, and a second electronic valve associated with said first valve and arranged to be conditioned by its associated first valve in response to the conditioning of its associated first valve.

13. In a signalling system, a generator, a pair of voltage producing elements connected to said generator, means for causing said generator to produce currents of different frequencies and apply the generated currents to said elements, one of said elements arranged to produce a voltage which is constant irrespective of the frequency of the applied current and the other arranged to produce a voltage which varies with the frequency of the applied current, a series of devices each arranged to operate only with certain differences in the potentials produced by said elements, and means for applying the produced one of said variable voltages and said constant voltage to said devices whenever a current of a certain frequency is produced by said generator to thereby operate only the device or devices arranged to be operated thereby.

14. In a signalling system, a generator, a first transformer having a primary connected to said generator, a second transformer having a primary with a condenser connected in shunt therewith and connected to said generator, means for causing said generator to produce currents of different frequencies, said currents being applied over said connections to said transformer primaries whereby said first transformer primary induces a voltage of constant magnitude in its secondary regardless of the frequency of the current applied thereto and said second transformer primary induces a voltage in its secondary whose magnitude corresponds to the frequency of the current applied thereto, and a plurality of switching devices connected to the secondaries of said transformers whereby said voltage of constant magnitude and a voltage corresponding to the frequency of the generated current are applied to all of said devices, one of said devices arranged to operate only when a predetermined difference exists between the voltages applied thereto and another of said devices arranged to operate when said predetermined difference and another predetermined difference exists between the voltages applied thereto.

References Cited in the file of this patent

UNITED STATES PATENTS

| | | |
|---|---|---|
| 1,691,222 | Bohm | Nov. 13, 1928 |
| 1,952,369 | Gardner | Mar. 27, 1934 |
| 1,982,290 | Gardner | Nov. 27, 1934 |
| 1,986,921 | Demarest | Jan. 8, 1935 |
| 2,038,649 | Damarest | Apr. 28, 1936 |
| 2,512,879 | Roggenstein | June 27, 1950 |